United States Patent
Yandt

[11] 3,823,857
[45] July 16, 1974

[54] SPARE TIRE CARRIER

[76] Inventor: Carl F. Yandt, 703 Oak Ter., La Cresent, Minn. 55947

[22] Filed: Apr. 17, 1972

[21] Appl. No.: 244,610

[52] U.S. Cl............................ 224/42.24, 224/42.12
[51] Int. Cl............................................ B62d 43/00
[58] Field of Search... 224/42.12, 42.42 R, 42.45 R, 224/29 R, 42.1 F, 42.13, 42.1 T, 42.1 R, 29 R

[56] References Cited
UNITED STATES PATENTS

| | | | |
|---|---|---|---|
| 2,698,119 | 12/1954 | Cicogna | 224/42.1 E X |
| 2,839,232 | 6/1958 | Homeier | 224/42.12 |
| 2,970,728 | 2/1961 | Haas | 224/42.12 |
| 3,349,977 | 10/1967 | Caminiti | 224/42.24 X |

FOREIGN PATENTS OR APPLICATIONS

| | | | |
|---|---|---|---|
| 1,188,329 | 3/1959 | France | 224/42.1 F |

Primary Examiner—Robert G. Sheridan
Assistant Examiner—Jerold M. Forsberg
Attorney, Agent, or Firm—Arthur J. Hansmann

[57] ABSTRACT

A spare tire carrier for mounting onto an automobile and supporting an assembled tire and rim, including a plurality of radially extending arms having cushion supports underneath for supporting the carrier on the automobile. The arms are pivotally interconnected through a connector, and upstanding lugs engage the tire rim and align the rim on the carrier, and a threaded member holds the rim down onto the carrier. Straps extend from the arms and hooks are on the ends of the straps for hooking onto the trunk lid and onto the automobile bumper.

7 Claims, 4 Drawing Figures

PATENTED JUL 16 1974 3,823,857
SHEET 2 OF 3
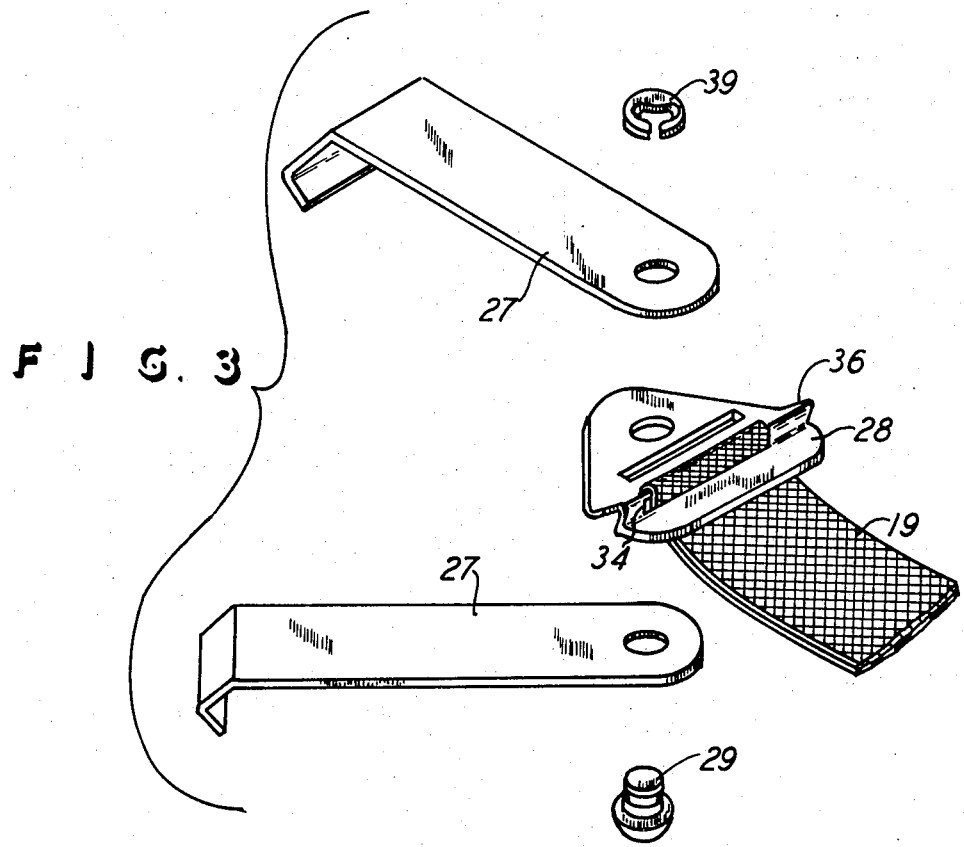
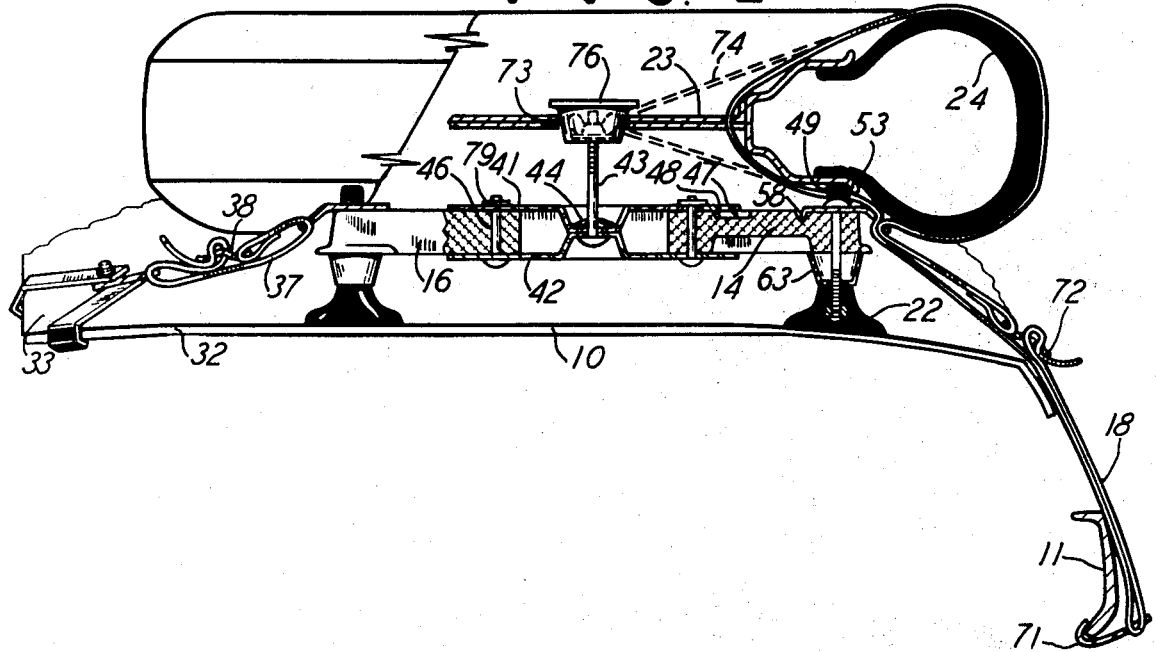

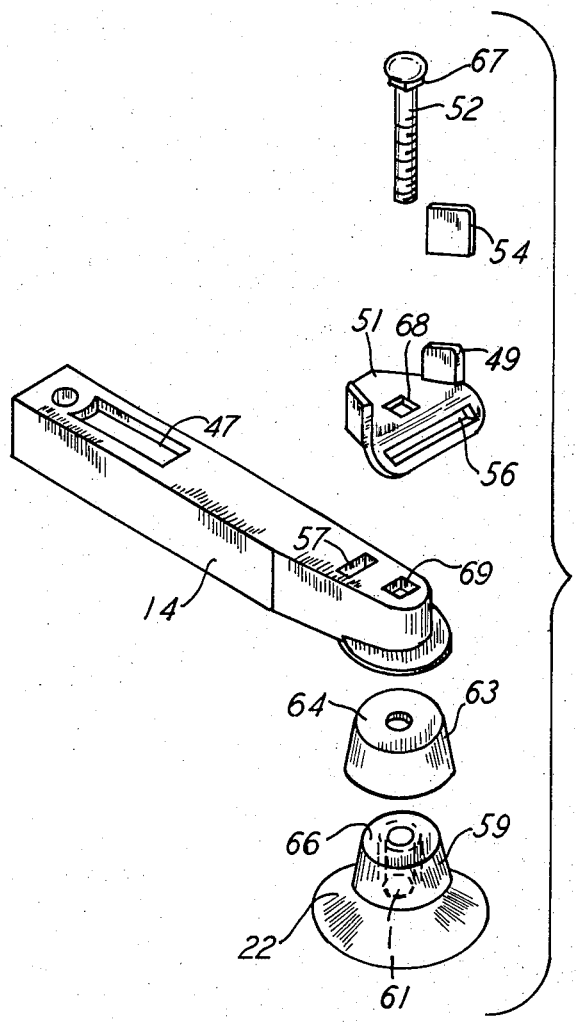

SPARE TIRE CARRIER

This invention relates to a spare tire carrier of the type which can be mounted on the top of an automobile, such as on the trunk lid, for supporting the automobile tire and rim on the outside of the trunk compartment.

BACKGROUND OF THE INVENTION

Spare tire carriers are already known in the industry, and examples of such are found in U.S. Pat. Nos. 2,839,232 and 2,970,728 and 3,349,977. These prior patents all show a type of spare tire carrier which is positioned on the top of the trunk lid for carrying the automobile tire and rim outside the trunk compartment.

However, even with the aforementioned teachings and disclosures of carriers, there are no carriers which are commonly available or popular on the market, and this indicates the shortcomings of the prior art carriers, such as those mentioned above. There are several problems and matters of concern in providing a spare tire carrier, and these include the problems of providing a carrier which accommodates spare tires of different diametrical sizes of tire rims, providing a carrier which is lightweight and compact when it is not being used, providing a carrier which supports the tire in a safe manner from the standpoint of both passenger safety and damage to the finish of the automobile, providing a carrier which is sturdy but inexpensive in manufacture, providing a carrier which can be very readily and easily positioned on the trunk and which is securely retained in a set position on the trunk, and providing a carrier which has a height adjusting feature for accommodating trunks of different curvature. The aforementioned problems are some of the concerns in the manufacture of a carrier, and there are even additional problems, and none of these problems is either fully or in any way solved by the prior art carriers.

Accordingly, it is the purpose of this invention to provide a spare tire carrier which is the answer to the aforementioned concerns and problems.

With specific reference to a carrier of this invention, this carrier is arranged for ready and easy positioning on the trunk lid, and straps and hooks extend on the carrier from supporting arms, and the hooks attached to the trunk lid in a manner which prevents movement of the carrier after it is set in place. In accomplishing this object, two hooks extend at each corner of the trunk lid on opposite sides of the corner and prevent the carrier arms from moving in any direction away from the lid corner. Additionally, one of the securing straps extends over the spare tire and rim assembly itself, and that strap extends down to the automobile bumper and attaches thereto so that the tire cannot move forwardly of the automobile and thereby present any safety hazard to the automobile or the passengers in the automobile in the event of a rear end collision or of fast deceleration of the automobile.

Another specific objective of this invention is to provide a spare tire carrier which, in a single unit, accommodates rims of different diametrical sizes, whether it be 14-inch or 15-inch or any other size. In accomplishing this object, the carrier of this invention is provided with a rim-engaging lugs which align and secure the rim relative to the carrier, and the lugs may be radially adjusted to accommodate the different rim sizes mentioned. In this manner, the assembled tire and rim are securely held relative to the carrier, and the carrier itself is securely held relative to the automobile, such as mentioned in the preceding paragraph. Further, a carrier of this invention has an arrangement for adjusting the height of the carrier so that it can be positioned at different elevations, according to particular needs or desires relative to the automobile in which it is being used.

Still another objective of this invention, and a feature thereof relative to the concern of different sizes of trunk lids, is the feature of having the carrier adapt to various trunk lid sizes, and with the adaptation feature being simplified and in fact automatically accomplished by the installation of the carrier itself.

Other objects and advantages will become apparent upon reading the following disclosure in light of the accompanying drawings.

BRIEF DESCRIPTION OF THE DRAWINGS

FIG. 2 is a side view of the carrier shown in FIG. 1, and with the view being substantially in section and with the section taken along the line 2—2 of FIG. 1.

FIG. 3 is an exploded perspective view of the corner hooks and strap shown in FIGS. 1 and 2.

FIG. 4 is an exploded perspective view of one of the arms and its attached pieces as shown in FIG. 1.

DETAILED DESCRIPTION OF THE PREFERRED EMBODIMENT

Figure 1:
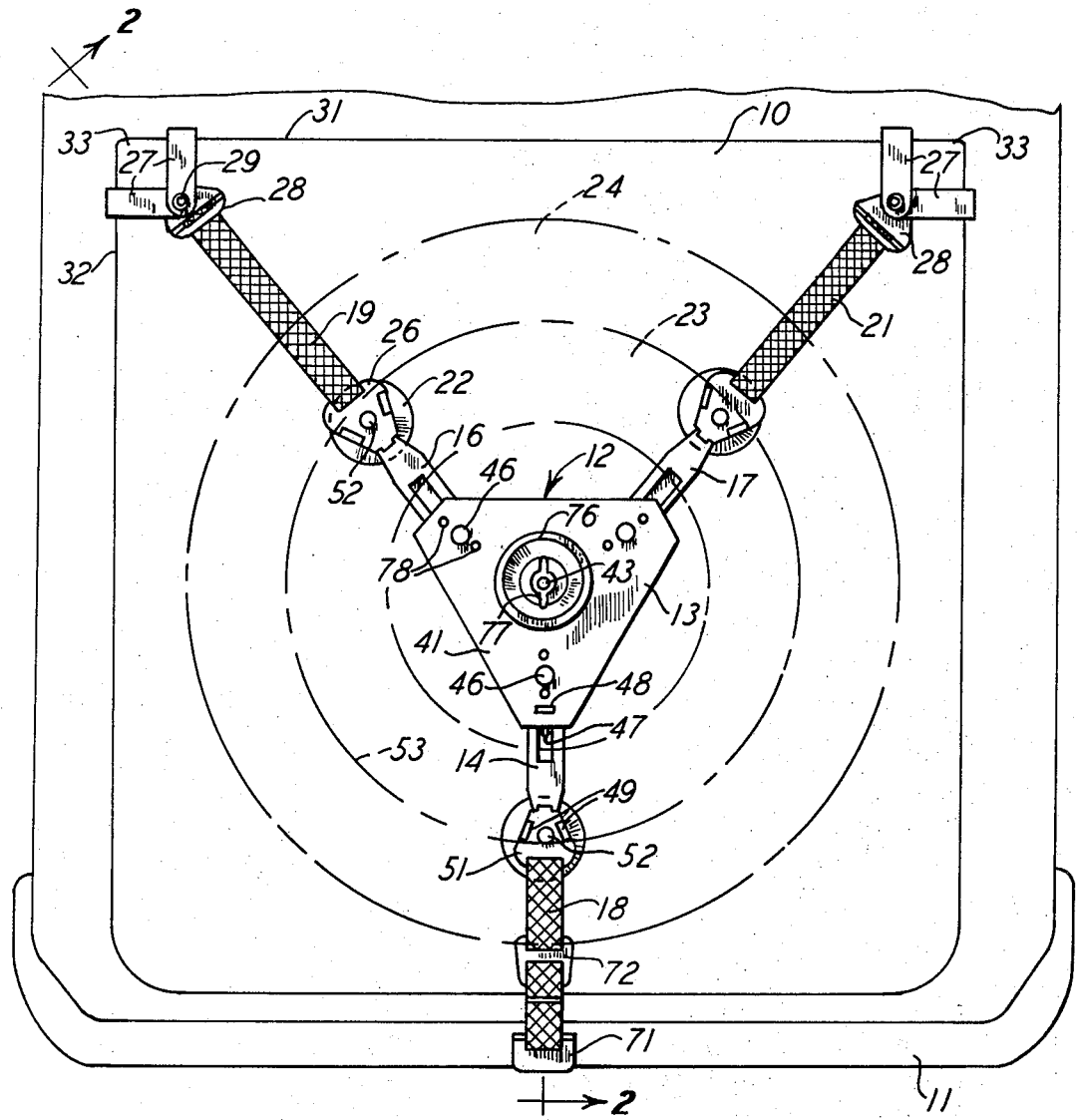
FIG. 1 is a top plan view of a preferred embodiment of the carrier of this invention, and showing the rear end of a automobile therebelow and showing a spare tire in dot-dash lines.

FIGS. 1 and 2 show the rear end of an automobile, including the automobile trunk lid 10 and rear bumper 11. The carrier of this invention is shown supported on the top of the trunk lid 10, and is generally designated 12 and it basically consists of a centrally located connector 13, three radially extending arms 14, 16 and 17, and straps 18, 19 and 21 which respectively extend from the three arms.

The radially extending ends of the three arms all have a cushion support in the form of a suction cup 22 which contacts the trunk lid for locating the carrier 12 on the lid and for preventing damage to the finish of the automobile. Of course it will also be seen and understood that the radially outer ends of the three arms are in contact with the assembly of the automobile rim 23 and tire 24. Each radially extending arm has a bracket 26 attached thereto, and the respective straps are threaded through the brackets 26 and extend to members connecting the straps to the automobile. Thus, with reference to straps 19 and 21, two hooks 27 are pivotally attached relative to each other and relative to strap 19 through a buckle 28 and a pivot pin 29 connecting the hooks 27 to the buckle 28. It will therefore be seen and understood that one of the hooks 27 extends over the trunk lid front edge 31, and the other of the two hooks 27 extends over the trunk lid side edge 32. Thus, the trunk lid edges 31 and 32 define the trunk lid corner 33, and the hooks 27 straddle the corner 33 and are therefore secure against movement toward the carrier connector 13. In this manner, the carrier of this invention is positively and securely anchored relative to the trunk lid 10, and the carrier cannot move relative to the lid 10, and the carrier is automatically and therefore readily and accurately positioned and secured on the trunk lid 10. FIGS. 2 and 3 show the construction and arrangement of the hooks 27 and the buckle 28 and the connection for the respective straps 19 and 21. With reference to FIG. 3, it will be seen that the strap 19 is positively secured relative to the buckle 28 by means of threading through the buckle opening 34, and by having the buckle with its raised portion 36, all arranged so that tension in the strap 19 causes the buckle to firmly grip the strap 19 and hold it. FIG. 2 shows a slightly different arrangement for threading the strap, and the strap is here designated 37, and the strap 37 is held by the buckle 38 of FIG. 2. In both instances, it will of course be understood that the straps can be pulled to adjust their overall length by simply sliding them with respect to their connecting buckles or brackets, and such length adjustment can be of any conventional arrangement, so the carrier can be adjusted to fit any size trunk lid 10. However, in both arrangements as shown in FIGS. 1 and 2, the hooks 27 are pivotally connected by the pin 29 which is held by means of a snap fastener 39 shown in FIG. 3.

The arms 14, 16 and 17 are pivotally connected together in that they are connected to the connector 13 which is actually seen to be two spaced-apart plates 41 and 42 which are held together by a threaded bolt 43 extending therethrough and held by a nut 44, and the plates 41 and 42 are held together by pins 46 extending through the plates and through the radially inner ends of the respective arms. More specifically, arms 16 and 17 can pivot relative to the arm 14 and of course relative to the connector 13, such that the arms 16 and 17 directly align with the trunk lid corners 33, and the arms 16 and 17 can also swing into positions adjacent the arm 14, so that the entire carrier 12 can be placed in a compact position when not in use. The arm 14 is shown to be held non-pivotal relative to the connector 13, but of course it is still pivotal relative to the arms 16 and 17, as mentioned. However, the arm 14 has a recess 47 which receives a tang 48 shown bent downwardly on the connector upper plate 46. This holds the arm 14 against pivotal action relative to the connector 13, and thus the positioning of the arm 14 on the fore-and-aft axis of the automobile, that is in the position shown in FIGS. 1 and 2, aligns and positions the entire carrier 12 relative to the automobile. With this arrangement, the user need not guess at the position of the carrier for alignment.

The radially extending ends of each of the three arms have upstanding projections or lugs 49 which are actually on a plate 51 secured to the end of each of the arms by means of a screw 52, as best seen in FIG. 4. The lugs 49 extend upwardly and engage the rim 23 at the rim circumference designated 53 in FIGS. 1 and 2. With this arrangement, the assembled tire and rim are automatically aligned and retained relative to the carrier 12. FIG. 4 further shows that the lugs 49 are preferably provided with cushions in the form of plastic covers 54 which can slip over the lugs proper and thereby avoid marring the rim, such as might be the case where the lugs 49 are made of a metal material and are directly in contact with the rim 23.

FIG. 4 further shows that the plates 51 have slots 56 for receiving the respective anchoring straps 18, 19, and 21. Also, the drawings show that the ends of each of the three arms have indentations 57, and the plates 51 have offset ends 58 which hook into the indentations 57 and thus retain the plates 51 in radial alignment on the respective arms. FIG. 4 further shows that the suction cups 22 are held to the arms by the respective bolts 52 which extend into the cups which have upstanding bosses 59 which are shown to be conically and cup-shaped. Threaded sleeves or nuts 61 are anchored in the suction cups 22 for receiving the bolts 52 and fastening therewith in a conventional manner. The radial outer ends of the arms 14 have flanges which extend over a metal cup 63 which is also conically-shaped but inverted as seen in FIG. 4, and the cup 63 extends down over the suction cup boss 59 such that the base 64 of the cup 63 is on top of and in contact with the top 66 of the suction cup boss 59. That is, in one position of the two cups 59 and 63, the cups are nested together and the overall height of the end of the arm above the top of the trunk lid 10 is basically only the height of the suction cup 22, at least in the context of the following explanation. FIG. 2 shows a different position for the cup 63, and the position in FIG. 2 is the right-side-up position of the cup 63, compared to the upside-down cup position of FIG. 4 relative to the cup 63. It will then be seen and understood that in the right-side-up position of FIG. 2 for the cup 63, the carrier 12 is positioned at a higher elevation, namely the higher amount determined by the height of the cup 63. With this arrangement, the carrier 12 can be utilized with the cup 63 in either the upside-down position of FIG. 4 or the right-side-up position of FIG. 2, and the carrier 12 will then be useful in either position and at either elevation. That is, if a trunk lid had a curvature which required that the central portion of the carrier 12 in the area of the bolt 43 needed additional elevation for clearing the high spot on the trunk lid 10, then the cup 63 can be placed in the position shown in FIG. 2 to accommodate the greater curvature on the trunk lid.

In the manufacture and assembly of the parts as seen in FIG. 4, it will be seen that the bolt 52 is a carriage bolt having the usual square head 67 which fits into a square opening 68 in the plate 51 and square opening 69 in the extending ends of each of the arms. Thus, one does not need any tools for tightening the assembly of the parts shown in FIG. 4, since only hand rotation of the suction cup 22 is required for tightly assembling the parts shown, since the carriage bolt 52 will not rotate while the suction cup 22 is being tightened. With this further arrangement, one can immediately and easily convert between the low and the high positioning for the carrier, as just described.

The strap 18 connected to the rear arm 14 also connects to a hook 71 which goes over the automobile bumper 11 and is secure therewith. Further, FIG. 2 shows that the strap 18 extends through the rim 23 and around the tire 24, and it can be adjusted in length by means of the conventional type adjusting buckle 72. The strap 18 can either extend through the conventional lug openings in the rim 23, or it can extend through the central opening at 73 in the rim 23, and such extent is shown in dotted lines 74. Thus the strap 18 is directly attached to the tire and rim assembly, and it is also attached to a structural part of the automobile, namely, the bumper 11, so that, in the event of a rear end collision, the tire and rim assembly will not be likely to be forced through the rear window of the automobile. Also, even in the event of rapid deceleration of the automobile, the strap 18 will secure the tire and rim assembly against relative forward motion on the autombile and again prevent the assembly from going through the rear window of the automobile.

In all instances relative to the three straps described, it should be understood that once the straps are tightened in the manners described and by uses of the conventional self-tightening buckles mentioned, then the straps cannot loosen by having the respective hooks slide relative to the automobile, since there is no place towards which the hooks can slide since all tension is directly to the center of the carrier 12.

To hold the tire and rim assembly downwardly on the carrier 12, a flanged member 76 is piloted on the bolt 43 and a wing nut 77 threads onto the bolt 43 and holds the member 76 onto the bolt 43. The member 76 is shown to be conically shaped, and it extends through the rim opening 73 and it thus provides alignment of the axis of the rim 23 relative to the carrier 12.

FIG. 1 shows that the connector plates 41 and 42 both have a series of holes 78 which are radially disposed on the connector 13 and which receive the pins 46 which attach the respective arms to the connector 13. It will thus be seen and understood that each pin 46 can be positioned in any selected pair of aligned holes 78 between plates 41 and 42, and thus the respective arms 14, 16, and 17 can be radially adjusted relative to the connector 13 and therefore relative to each other. Such radial adjustment permits the carrier to be adjusted to accommodate rims of different diametrical sizes, as mentioned at the outset of this document. Thus the varying rim sizes of 13-inch, 14-inch, and 15-inch can all be accommodated by the three adjusted positions indicated in the drawings. Also, the pins 46 are held by means of simple snap fasteners 79, somewhat similar to the fastener 39, and therefore the pins 46 can be readily released and positioned and resecured, as desired.

What is claimed is:

1. A spare tire carrier for mounting onto the trunk lid of an automobile for supporting a single assembled tire and rim, said carrier being adjustable for supporting tire and rim assemblies of different diameters, comprising a connector member, a fastener member supported on said connector member at the center of said connector member for attaching to said assembled tire and rim, said connector member having sets of a plurality of holes uniformly spaced along respective radial lines equidistant from said center of said connector member, a plurality of radially extending arms, a pin extending through each of said arms and respective ones of said holes of said connector member for attaching said arms to said connector member, a projection on the extending end of each of said arms and extending thereabove for engaging the rim of the assembled tire and rim and laterally restraining the assembled tire and rim on said carrier and preventing falling off, and with said plurality of radially spaced holes selectively receiving, said pins for uniformly radially adjusting the radial position of said projections equidistantly relative to said connector member to thereby accommodate tire and rim assemblies of different radial sizes, cushion means attached to the extending end of each of said arms and extending therebelow for supporting said arms on the trunk lid, a strap attached to the extending end of each of said arms, and hooks attached to the extending ends of said straps for attaching to the automobile.

2. The carrier as claimed in claim 1, wherein one of said arms is non-pivotally connected to said connector member and extends radially therefrom and positions said connector member relative to said one arm.

3. The carrier as claimed in claim 1 wherein said fastener member is a threaded member attached to said connector member and extends upwardly therefrom, a flared member releasably secured to the upper end of said threaded member and extending into the central opening in the tire and rim assembly for aligning and holding said assembly relative to said projections on said arms.

4. The carrier as claimed in claim 1, wherein at least one of said straps extends through said assembled tire and rim and connects to the bumper of the automobile.

5. The carrier as claimed in claim 1, wherein said cushion means are suction cups having upper bosses, a rigid cup for receiving each of said bosses in an upside-down position and to have said suction cup vertically close to said arm, a bolt extending through each of said arms and said rigid cups and said suction cups, and said rigid cups being removable from the assemblage and invertible to a right-side-up position and extending between said arm and said suction cup to space the latter two apart a distance greater than the close position, and thereby accommodate the mounting of said carrier on a trunk lid having a central curvature.

6. The carrier as claimed in claim 1, wherein at least two of said straps extend to respective front corners of said trunk lid, and each of said two straps having two hooks for attaching to said trunk lid corners.

7. A spare tire carrier for mounting onto the trunk lid of an automobile for upwardly supporting an assembled tire and rim, comprising a plurality of radially extending arms, cushion means attached to the extending end of each of said arms and extending therebelow for supporting said arms on the trunk lid, a projection on the extending end of each of said arms and extending thereabove for engaging the rim of the assembled tire and rim and laterally restraining the assembled tire and rim on said carrier and preventing falling off, a strap attached to the extending end of each of said arms, hooks attached to the extending ends of said straps for attaching to the automobile, a connector, said arms being attached to said connector with one of said arms being non-pivotally attached to said connector for positioning said connector according to the position of said one arm, and with said one arm being positioned to extend rearwardly on the automobile trunk lid, and two other of said arms being pivotally attached to said connector, and two of said hooks pivotally attached to each of said straps on said two arms for hooking opposite sides of the front corners of the trunk lid, for aligning said two arms and holding them against pivotal action.

* * * * *